US006980695B2

(12) United States Patent
Mehrotra

(10) Patent No.: US 6,980,695 B2
(45) Date of Patent: Dec. 27, 2005

(54) RATE ALLOCATION FOR MIXED CONTENT VIDEO

(75) Inventor: Sanjeev Mehrotra, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 648 days.

(21) Appl. No.: 10/186,481

(22) Filed: Jun. 28, 2002

(65) Prior Publication Data

US 2004/0001638 A1    Jan. 1, 2004

(51) Int. Cl.[7] .............................................. G06K 9/36
(52) U.S. Cl. ..................... 382/244; 382/232; 382/240; 382/251; 382/173; 375/240.03; 375/240.16
(58) Field of Search .............................. 382/244, 243, 382/236, 232, 233, 234, 238, 245, 246, 239, 382/176, 190, 240, 251; 375/240.1, 240.03, 375/240.16; 345/426; 341/55; 709/247; 708/203

(56) References Cited

U.S. PATENT DOCUMENTS

| | | | |
|---|---|---|---|
| 4,051,470 A | 9/1977 | Esteban et al. | |
| 4,937,036 A | 6/1990 | Beard et al. | |
| 5,043,919 A | 8/1991 | Callaway et al. | |
| 5,414,796 A | 5/1995 | Jacobs et al. | |
| 5,457,495 A | 10/1995 | Hartung | |
| 5,467,134 A | 11/1995 | Laney et al. | |
| 5,579,430 A | 11/1996 | Grill et al. | |
| 5,586,200 A * | 12/1996 | Devaney et al. | 382/232 |
| 5,623,424 A * | 4/1997 | Azadegan et al. | 708/203 |
| 5,678,002 A | 10/1997 | Fawcett et al. | |
| 5,686,964 A | 11/1997 | Tabatabai et al. | |
| 5,742,735 A | 4/1998 | Eberlein et al. | |
| 5,745,738 A | 4/1998 | Ricard | |
| 5,819,215 A | 10/1998 | Dobson et al. | |
| 5,835,149 A | 11/1998 | Astle | |
| 5,845,243 A | 12/1998 | Smart et al. | |
| 5,926,226 A | 7/1999 | Proctor et al. | |
| 5,995,151 A | 11/1999 | Naveen et al. | |
| 6,029,126 A | 2/2000 | Malvar | |
| 6,111,914 A | 8/2000 | Bist | |
| 6,115,689 A | 9/2000 | Malvar | |
| 6,160,846 A | 12/2000 | Chiang et al. | |
| 6,182,034 B1 | 1/2001 | Malvar | |
| 6,212,232 B1 | 4/2001 | Reed et al. | |
| 6,226,407 B1 | 5/2001 | Zabith et al. | |

(Continued)

OTHER PUBLICATIONS

Li et al., "Optimal Linear Interpolation Coding for Server-Based Computing," *Proc. IEEE Int'l Conf. on Communications*, 5 pp. (Apr.-May 2002).

(Continued)

*Primary Examiner*—Kanjibhai Patel
*Assistant Examiner*—Ali Bayat
(74) *Attorney, Agent, or Firm*—Klarquist Sparkman, LLP

(57) ABSTRACT

The present invention relates to regulating the quality and/or bitrate of content within mixed content video when the video is compressed subject to a bitrate constraint. For example, a screen capture encoder encodes palletized content within a frame of screen capture video. Subject to an overall bitrate constraint, the encoder then allocates bits for continuous tone content within the frame. By controlling the allocation of bits used to encode the continuous tone content, the encoder regulates bitrate for the continuous tone content. This in turn can allow the encoder to regulate spatial quality and/or overall temporal quality for the video. In one scenario, for screen capture video encoded to a (relatively) constant overall bitrate, the screen capture encoder reduces the bitrate (and quality) of the continuous tone content, instead spending bits to increase the overall frame rate of the video.

20 Claims, 7 Drawing Sheets

U.S. PATENT DOCUMENTS

| | | | |
|---|---|---|---|
| 6,243,497 B1 | 6/2001 | Chiang et al. | |
| 6,278,735 B1 | 8/2001 | Mohsenian | |
| 6,370,502 B1 | 4/2002 | Wu et al. | |
| 6,522,693 B1 * | 2/2003 | Lu et al. ................ | 375/240.02 |
| 6,573,915 B1 | 6/2003 | Sivan et al. | |
| 6,574,593 B1 | 6/2003 | Gao et al. | |
| 6,654,417 B1 | 11/2003 | Hui | |
| 6,654,419 B1 * | 11/2003 | Sriram et al. .......... | 375/240.12 |
| 6,748,391 B1 | 6/2004 | Schwerdtfeger et al. | |
| 2002/0143556 A1 | 10/2002 | Kadatch | |
| 2002/0176624 A1 * | 11/2002 | Kostrzewski et al. ....... | 382/173 |
| 2003/0110236 A1 * | 6/2003 | Yang et al. .................. | 709/219 |
| 2003/0115041 A1 | 6/2003 | Chen | |
| 2003/0115042 A1 | 6/2003 | Chen | |
| 2003/0115050 A1 | 6/2003 | Chen | |
| 2003/0115051 A1 | 6/2003 | Chen | |
| 2003/0115052 A1 | 6/2003 | Chen | |
| 2005/0015528 A1 * | 1/2005 | Du .............................. | 710/68 |
| 2005/0084166 A1 * | 4/2005 | Boneh et al. ............... | 382/239 |

OTHER PUBLICATIONS

Vetro et al., "An Overview of MPEG-4 Object-Based Encoding Algorithms," *IEEE 2001 Int'l Symp. on Information Tech.* (*ITCC 2001*), Las Vegas, NV, pp. 366-369 (2001).

Schaar-Mitrea et al., "Hybrid Compression of Video with Graphics in DTV Communication Systems," *IEEE Trans. on Consumer Electronics*, pp. 1007-1017 (2000).

Matthias, "An Overview of Microsoft Windows Media Screen Technology," 3 pp. (2000). [Dowloaded from the World Wide Web on May 1, 2002.].

Gill et al., "Creating High-Quality Content with Microsoft Windows Media Encoder 7," 4 pp. (2000). [Dowloaded from the World Wide Web on May 1, 2002.].

Ronda et al., "Rate Control and Bit Allocation for MPEG-4," *IEEE Transactions on Circuits and Systems for Video Technology*, pp. 1243-1258 (1999).

RICOH Silicon Valley Inc., "RICOH CREW Image Compression Standard, Version 1.0 (Beta)," 146 pp. (1999).

Palmer et al., "Shared Desktop: A Collaborative Tool for Sharing 3-D Applications Among Different Window Systems," *Digital Tech. Journal*, v. 9, No. 3, pp. 42-49 (1997).

ISO/IEC, JTCI/SC29/WG11 N2202, "Coding of Audio-Visual Objects: Visual," 14496-2 Committee Draft, 330 pp. (1998).

ITU, ITU-T Recommendation H.263, "Video Coding for Low Bit Rate Communication," 167 pp. (1998).

ITU, ITU-T Recommendation H.262, "Transmission of Non-Telephone Signals, Information Technology—Generic Coding of Moving Pictures and Associated Audio Information: Video," 223 pp. (1995).

ITU, ITU-T Recommendation H.261, "Line Transmission of Non-Telephone Signals, Video Codec for Audiovisual Services at p=64 kbits," 31 pp. (1993).

Askoy, "Wireless Thin Client Optimization for Multimedia Applications," M.S. Thesis, 166 pp. (2000).

Caetano et al., "Rate Control Strategy for Embedded Wavelet Video Coders," *Electronics Letters*, pp. 1815-1817 (Oct. 14, 1999).

Cheung et al., "A Comparison of Scalar Quantization Strategies for Noisy Data Channel Data Transmission," *IEEE Transactions on Communications*, vol. 43, No. 2/3/4, pp. 738-742 (Apr. 1995).

Crisafulli et al., "Adaptive Quantization: Solution via Nonadaptive Linear Control," *IEEE Transactions on Communications*, vol. 41, pp. 741-748 (May 1993).

Dalgic et al., "Characterization of Quality and Traffic for Various Video Encoding Schemes and Various Encoder Control Schemes," Technical Report No. CSL-TR-96-701 (Aug. 1996).

Doering, "Low-Cost, High-Impact Video Production Techniques for Laboratory Instructional Materials," *ASEE/IEEE Frontiers in Education Conference*, Session F1C, pp. 14-18 (Oct. 2001).

ISO/IEC 13818-7, "Information Technology-Generic Coding of Moving Pictures and Associated Audio Information," Part 7: Advanced Audio Coding (AAC), pp. i-iv, 1-145 (1997).

ISO/IEC 13818-7, Technical Corrigendum 1, "Information Technology-Generic Coding of Moving Pictures and Associated Audio Information," Part 7: Advanced Audio Coding (AAC), Technical Corrigendum, pp. 1-22 (1997).

ISO, "MPEG-4 Video Verification Model version 18.0," ISO/IEC JTC1/SC29/WG11 N3908, Pisa, pp. 1-10, 299-311 (Jan. 2001).

ITU, Recommendation ITU-R BS 1115, Low Bit-Rate Audio Coding, 9 pp. (1994).

Jafarkhani, H., et al., "Entropy-Constrained Successively Refinable Scalar Quantization," *IEEE Data Compression Conference*, pp. 337-346 (1997).

Microsoft Corporation, "BitBlt" 8 pp. [Downloaded from the World Wide Web on Apr. 25, 2002.].

Naveen et al., "Subband Finite State Scalar Quantization," *IEEE Transactions on Image Processing*, vol. 5, No. 1, pp. 150-155 (Jan. 1996).

Nieh et al., "Measuring the Multimedia Performance of Server-Based Computing," *Proc. 10th Intl. Workshop on Network and Operating System Support for Digital Audio and Video*, 10 pp. (2000).

Ortega et al., "Optimal Buffer-Constrained Source Quantization and Fast Approximation," *IEEE*, pp. 192-195 (1992).

Ortega et al., "Adaptive Scalar Quantization Without Side Information," *IEEE Transactions on Image Processing*, vol. 6, No. 5, pp. 665-676 (May 1997).

Pike, "Graphics in Overlapping Bitmap Layers," *Computing Science Technical Report*No. 999, At&T Bell Labs., 25 pp. (1983).

Ramchandran et al., "Bit Allocation for Dependent Quantization with Applications to MPEG Video Coders," *IEEE*, pp. v-381-v-384 (1993).

Ratnakar et al., "RD-OPT: An Effieient Algorithm for Optimization DCT Quantization Tables," 11 pp.

Ribas Corbera et al., "Rate Control in DCT Video Coding for Low-Delay Communications," *IEEE Transactions on Circuits and Systems for Video Technology*, vol. 9, No. 1, pp. 172-185 (Feb. 1999).

Schulzrinne, "Operating System Issues for Continuous Media," *ACM Multimedia Systems*, vol. 4, No. 5, 13 pp. (1996).

Sidiropoulos, "Optimal Adaptive Scalar Quantization and Image Compression," *ICIP*, pp. 574-578, (1998).

Sullivan, "Optimal Entropy Constrained Scalar Quantization for Exponential and Laplacian Random Variables," *ICASSP*, pp. V-265-V-268 (1994).

Techsmith Corporation, "Techsmith Camtasia Screen Recorder SDK," 2 pp. (2001).

Techsmith Corporation, "Camtasia Feature of the Week, Jan. 4, 2001, Quick Capture," 2 pp. (2001).

Techsmith Corporation, "Camtasia Screen Recorder SDK DLL API User Guide," version 1.0, 66 pp. (2001).

Techsmith Corporation, "Camtasia v3.0.1—README. TXT," 19 pp. (Jan. 2002).

Trushkin, "On the Design on an Optimal Quantizer," *IEEE Transactions on Information Theory*, vol. 39, No., 4, pp. 1180-1194 (Jul. 1993).

Westerink et al., "Two-pass MPEG-2 Variable-bit-rate Encoding," *IBM J. Res. Develop.*, vol. 43, No. 4, pp. 471-488 (1999).

Wong, "Progressively Adaptive Scalar Quantization," *ICIP*, pp. 357-360, (1996).

Wu et al., "Entropy-Constrained Scalar Quantization and Minimum Entropy with Error Bound by Discrete Wavelet Transforms in Image Compression," *IEEE Transactions on Signal Processing*, vol. 48, No. 4, pp. 1133-1143 (Apr. 2000).

Wu et al., "Quantizer Monotonicities and Globally Optimally Scalar Quantizer Design," *IEEE Transactions on Information Theory*, vol. 39, No. 3, pp. 1049-1053 (May 1993).

* cited by examiner

Software 280 Implementing a Screen
Capture Encoder with Rate Allocation
for Continuous Tone Content

RATE ALLOCATION FOR MIXED CONTENT VIDEO

RELATED APPLICATION DATA

The following concurrently filed U.S. patent applications relate to the present application: 1) U.S. patent application Ser. No. 10/186,473, entitled, "Motion Estimation/Compensation for Screen Capture Video," filed Jun. 28, 2002, the disclosure of which is hereby incorporated by reference; 2) U.S. patent application Ser. No. 10/186,639, entitled, "Adaptive Entropy Encoding/Decoding for Screen Capture Content," filed Jun. 28, 2002, the disclosure of which is hereby incorporated by reference; and 3) U.S. patent application Ser. No. 10/186,887, entitled, "Text Detection in Continuous Tone Image Segments," filed Jun. 28, 2002, the disclosure of which is hereby incorporated by reference.

FIELD

The present invention relates to quality and rate control for mixed content graphical multimedia. For example, an encoder adjusts bit allocation between palettized content and continuous tone content when encoding a series of frames of captured screen areas.

BACKGROUND

Digital video consumes large amounts of storage and transmission capacity. A typical raw digital video sequence includes 15 or 30 frames per second. Each frame can include tens or hundreds of thousands of pixels (also called pels). Each pixel is a tiny element of the picture. In raw form, a computer commonly represents a pixel with 24 bits. Thus, the number of bits per second, or bitrate, of a raw digital video sequence can be 5 million bits/second or more.

Many computers and computer networks lack the resources to process raw digital video. For this reason, engineers often use compression (also called coding or encoding) to reduce the bitrate of digital video. Compression can be lossless, in which quality of the video does not suffer but decreases in bitrate are limited by the complexity of the video. Or, compression can be lossy, in which quality of the video suffers but decreases in bitrate are more dramatic. Decompression reverses compression.

Several international standards relate to video compression and decompression. These standards include the Motion Picture Experts Group ["MPEG"] 1, 2, and 4, and the H.26x series from the ITU. The compression techniques used in such standards include intraframe compression techniques (in which a frame is compressed as a still image) and interframe compression techniques (in which a frame is predicted or estimated from one or more other frames).

In general, video is a series of frames of visual content. The content within a frame may be continuous tone content or palettized content. Continuous tone content includes, for example, photographs or other images with gradually varying colors or tones. Continuous tone content typically uses a range of image tones that appears substantially continuous to the human eye. In many cases, the image tones are represented by 24-bit values ($2^{24}$=16,777,216 different possible colors), but other representations are possible. While it is desirable to encode continuous tone content using only lossless compression if sufficient resources are available, lossy compression is often used to effectively compress continuous tone content at lower bitrate. For example, the MPEG compression standards use lossy compression for encoding camera video consisting of sequences of video image frames. Lossy compression of continuous tone content can introduce errors or other distortions that show up when content is decompressed. Such distortions in continuous tone content are often not detectable or not significant when viewed with human eyes. In other cases, the distortions in continuous tone content are perceptible but acceptable under certain circumstances.

Palettized content appears in a variety of areas including windowed user interfaces or other graphical user interfaces, shared whiteboards or application sharing, or simple animations. Some common examples of palettized content include icons, toolbars, and command or notepad windows consisting of a flat color background and foreground text of a contrasting color. A color palette typically includes a relatively small set of image colors or tones. A simple color palette might include 256 different 24-bit colors, in which case image tones in palettized content could be represented by 8-bit values for the indices of the color palette ($2^8$=256). In practice, the number and organization of color palettes, the relationships of color palettes to content, and the representation of image tones in palettized content depend on implementation and can be very complex.

Palettized content often includes areas of perceptually important fine detail—spatially localized, high frequency variations depicting text elements or other image discontinuities. Applying lossy compression to palettized content can result in the loss of perceptually important fine detail. For example, text and sharp edges may be blurred or distorted in the decompressed content. As a result, lossless encoding of palettized content is preferred in many circumstances.

Screen capture is an example of an application in which content can include a mixture of palettized content and continuous tone content. A screen capture tool lets a computer user record an image displayed on a visual display unit such as a computer monitor. The user might use the captured screen area (alternatively called a screen area, screen image, screen shot, screen frame, screen region, capture area, capture image, capture shot, etc.) in a help manual or report to show the results displayed on the display unit at a particular time. For some applications, a user captures a series of screen areas to show how screen content changes. The user might use the series of captured screen areas within an instructional video for job training or remote instruction.

FIG. 1 is a captured screen area (100) of a computer desktop environment according to the prior art. The captured screen area (100) shows the entire desktop, but could instead show only the window (130) or some other portion of the desktop. A cursor graphic (140) overlays the window (130), and several icon graphics (120, 122, 124) overlay the background (110). The window (130), cursor graphic (140) and icon graphics (120, 122, 124) are examples of palettized content. The background (110) is an example of continuous tone content.

Several previous screen capture encoders have used lossless compression to reduce the bitrate of a series of captured screen areas. The lossless compression avoids blurriness and other spatial distortion in the palettized content in the series. However, bitrate is often unacceptably high (usually due to the lossless compression of complex continuous tone content in the series), necessitating reduction of the frame rate for the series. More generally, using the same compression techniques to encode palettized content and continuous tone content in a series of frames fails to take advantage of the differences between palettized content and continuous tone content.

SUMMARY

The present invention relates to regulating the quality and/or bitrate of content within mixed content video when the video is compressed subject to a bitrate constraint. By controlling the allocation of bits used to encode continuous tone content in the video, an encoder (e.g., a screen capture encoder) regulates bitrate for the continuous tone content. This in turn can allow the encoder to regulate spatial quality (quality of content within individual frames) and/or overall temporal quality (smoothness between frames, reducing dropped frames) for the video. The encoder takes advantage of differences between the continuous tone content and other components of the video such as palettized content to improve the efficiency of compression.

According to a first aspect of the present invention, an encoder losslessly encodes certain components of mixed content video and then allocates bits for encoding continuous tone content in the mixed content video. When the encoder encodes the continuous tone content, the allocation of bits helps regulate quality and bitrate for the continuous tone content (and hence, potentially, the overall quality and bitrate for the mixed content video as well).

According to a second aspect of the present invention, an encoder encodes a mixture of palettized content and continuous tone content. For example, the content is screen capture content. The encoder encodes the palettized content and allocates bits for encoding the continuous tone content. The bit allocation controls bitrate when the encoder then encodes the continuous tone content.

Additional features and advantages will be made apparent from the following detailed description of various embodiments that proceeds with reference to the accompanying drawings.

DETAILED DESCRIPTION

Techniques for allocating bits between continuous tone content and other components of a frame or series of frames are described. By taking advantage of differences between the continuous tone content and the other components, the described techniques improve the efficiency of compression in terms of bitrate and quality.

For example, in some embodiments, an encoder losslessly encodes certain components of a frame (e.g., frame headers, motion estimation data, segmentation data, and/or palettized content) before allocating bits for encoding the continuous tone content in the frame. The encoder then encodes the continuous tone content such that the allocation of bits affects the quality and bitrate for the continuous tone content. The types of content and techniques for encoding the content may vary depending on the type of frame (e.g., intra frames or inter frames) being encoded.

Several of the following sections describe a screen capture encoder that encodes a series of frames of screen capture areas. The screen capture areas include a mixture of palettized content and continuous tone content. Alternatively, another type of encoder or other tool uses the described techniques to regulate the quality and/or bitrate. For example, an encoder allocates bits between other mixed types of content and/or content from a different source. Moreover, while the screen capture encoder described below allocates bits for continuous tone content on a frame-by-frame basis, in alternative embodiments an encoder allocates bits on some other basis.

I. Computing Environment

Figure 1:
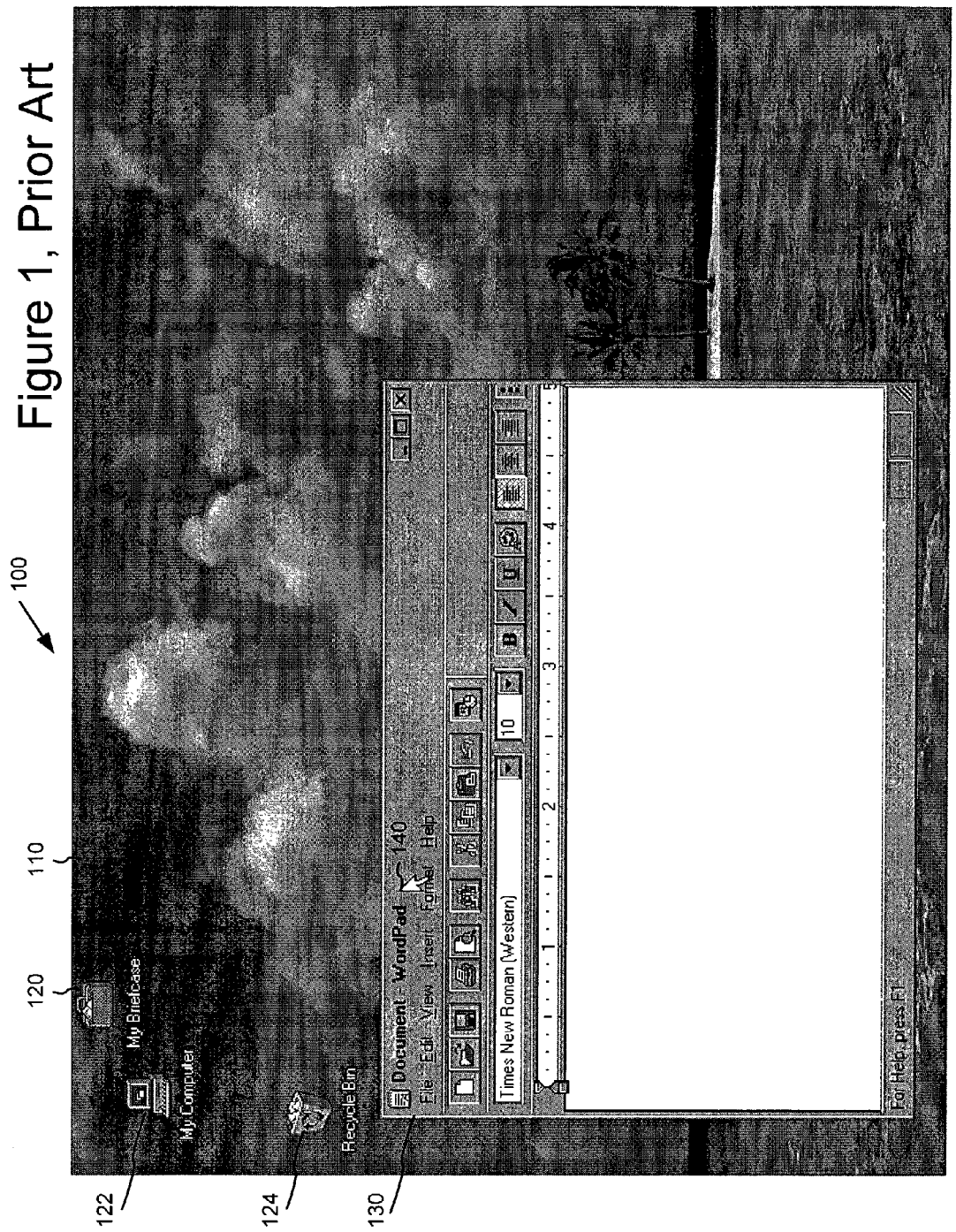
FIG. 1 is a captured screen area of a computer desktop environment according to the prior art.
Figure 2:
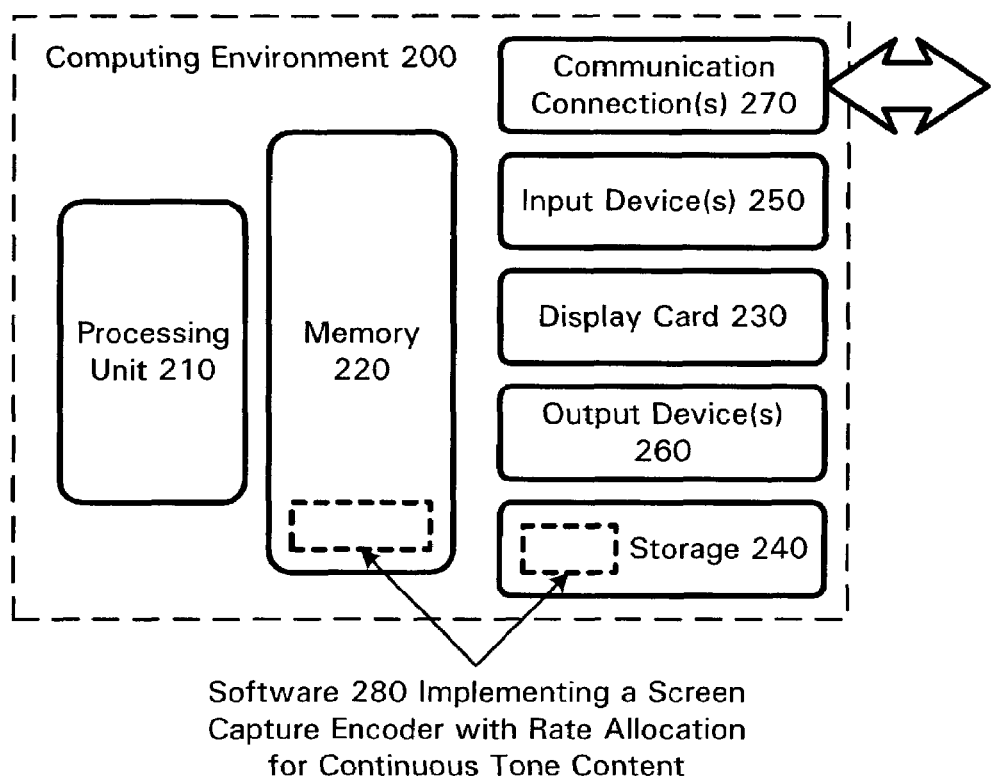
FIG. 2 is a block diagram of a suitable computing environment in which described embodiments may be implemented.

FIG. 2 illustrates a generalized example of a suitable computing environment (200) in which described embodiments may be implemented. The computing environment (200) is not intended to suggest any limitation as to scope of use or functionality of the invention, as the present invention may be implemented in diverse general-purpose or special-purpose computing environments.

With reference to FIG. 2, the computing environment (200) includes at least one processing unit (210) and memory (220). The processing unit (210) executes computer-executable instructions and may be a real or a virtual processor. In a multi-processing system, multiple processing units execute computer-executable instructions to increase processing power. The memory (220) may be volatile memory (e.g., registers, cache, RAM), non-volatile memory (e.g., ROM, EEPROM, flash memory, etc.), or some combination of the two. The memory (220) stores software (280) implementing a screen capture encoder with rate allocation for continuous tone content.

The computing environment (200) also includes a display card (230). The display card (230) (alternatively called the video card, graphics card, graphics output device, display adapter, video graphics adapter, etc.) delivers output to a visual display unit such as a computer monitor. The display card (230) includes a frame buffer that stores pixel information for display on a screen. The frame buffer is often some type of RAM on the display card (230), but can instead be some other kind of memory and/or not physically located on the display card itself. The display card (230) can include a graphics processor, graphics accelerator, and/or other specialized display hardware.

Typically, operating system software (not shown) provides an operating environment for other software executing in the computing environment (200), and coordinates activities of the components of the computing environment (200). In addition, display driver software allows access to various features of the display card (230). The display driver software can work in conjunction with one or more layers of operating system software through which access to the features of the display card (230) is exposed. For example, through such features, a screen capture tool might retrieve pixel information from the frame buffer of the display card (230) for screen content currently displayed on a screen of a visual display unit.

A computing environment may have additional features. For example, the computing environment (200) includes storage (240), one or more input devices (250), one or more output devices (260), and one or more communication connections (270). An interconnection mechanism (not shown) such as a bus, controller, or network interconnects the components of the computing environment (200).

The storage (240) may be removable or non-removable, and includes magnetic disks, magnetic tapes or cassettes, CD-ROMs, CD-RWs, DVDs, or any other medium which can be used to store information and which can be accessed within the computing environment (200). The storage (240) stores instructions for the software (280) implementing a screen capture encoder with rate allocation for continuous tone content.

The input device(s) (250) may be a touch input device such as a keyboard, mouse, pen, or trackball, a voice input device, a scanning device, sound card, TV tuner/video input card, or other device that provides input to the computing environment (200).

The output device(s) (260) may be a visual display unit, printer, speaker, CD-writer, or other device that provides output from the computing environment (200). A visual display unit presents screen content based upon output delivered from the display card (230).

The communication connection(s) (270) enable communication over a communication medium to another computing entity. The communication medium conveys information such as computer-executable instructions, compressed captured screen area information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The invention can be described in the general context of computer-readable media. Computer-readable media are any available media that can be accessed within a computing environment. By way of example, and not limitation, with the computing environment (200), computer-readable media include memory (220), storage (240), communication media, and combinations of any of the above.

The invention can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various implementations. Computer-executable instructions for program modules may be executed within a local or distributed computing environment.

For the sake of presentation, the detailed description uses terms like "capture," "encode," and "decode" to describe computer operations in a computing environment. These terms are high-level abstractions for operations performed by a computer, and should not be confused with acts performed by a human being. The actual computer operations corresponding to these terms vary depending on implementation.

II. Exemplary Screen Capture Encoder and Decoder

Figure 3:
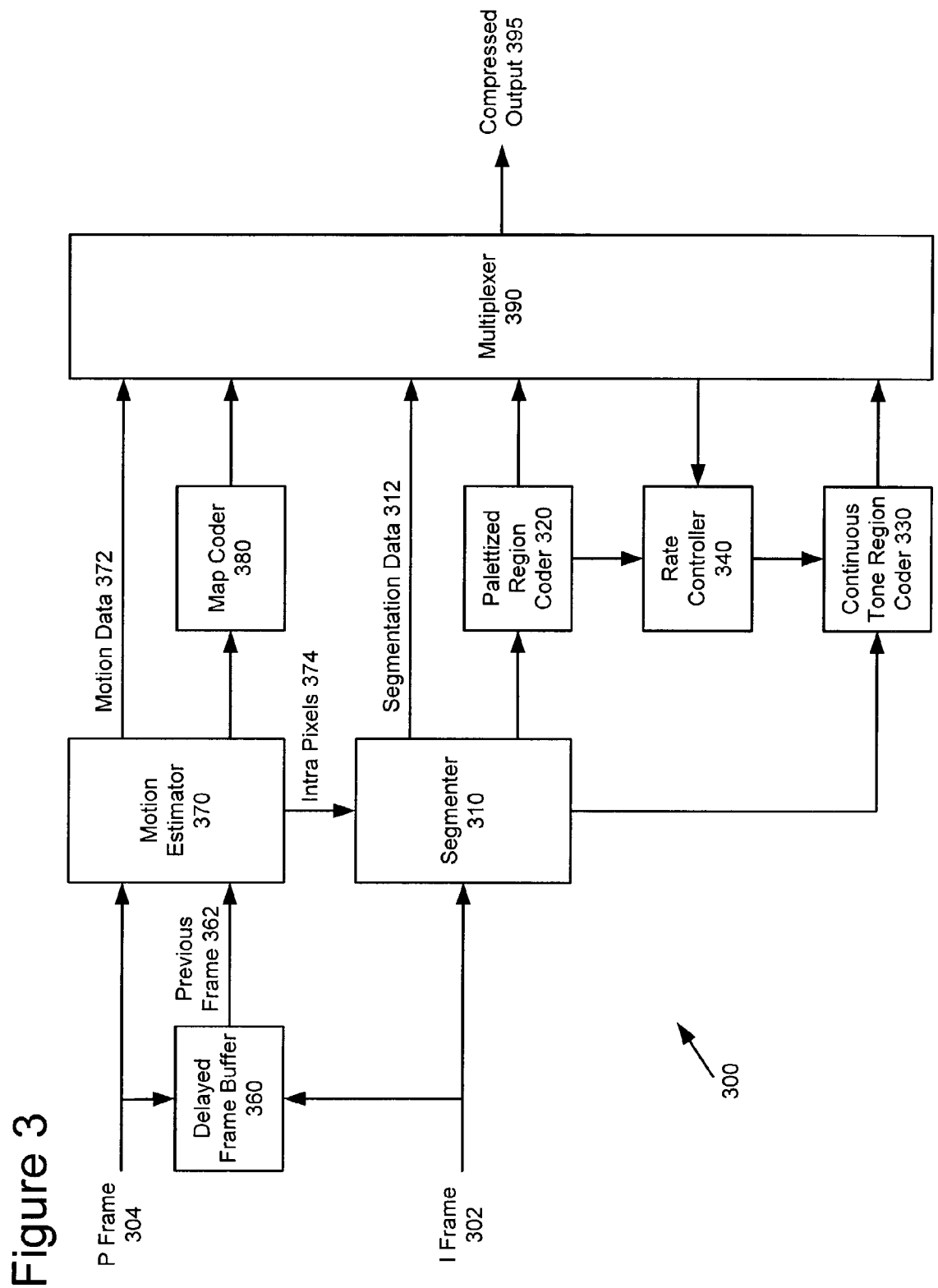
FIG. 3 is a block diagram of an exemplary screen capture encoder.
Figure 4:
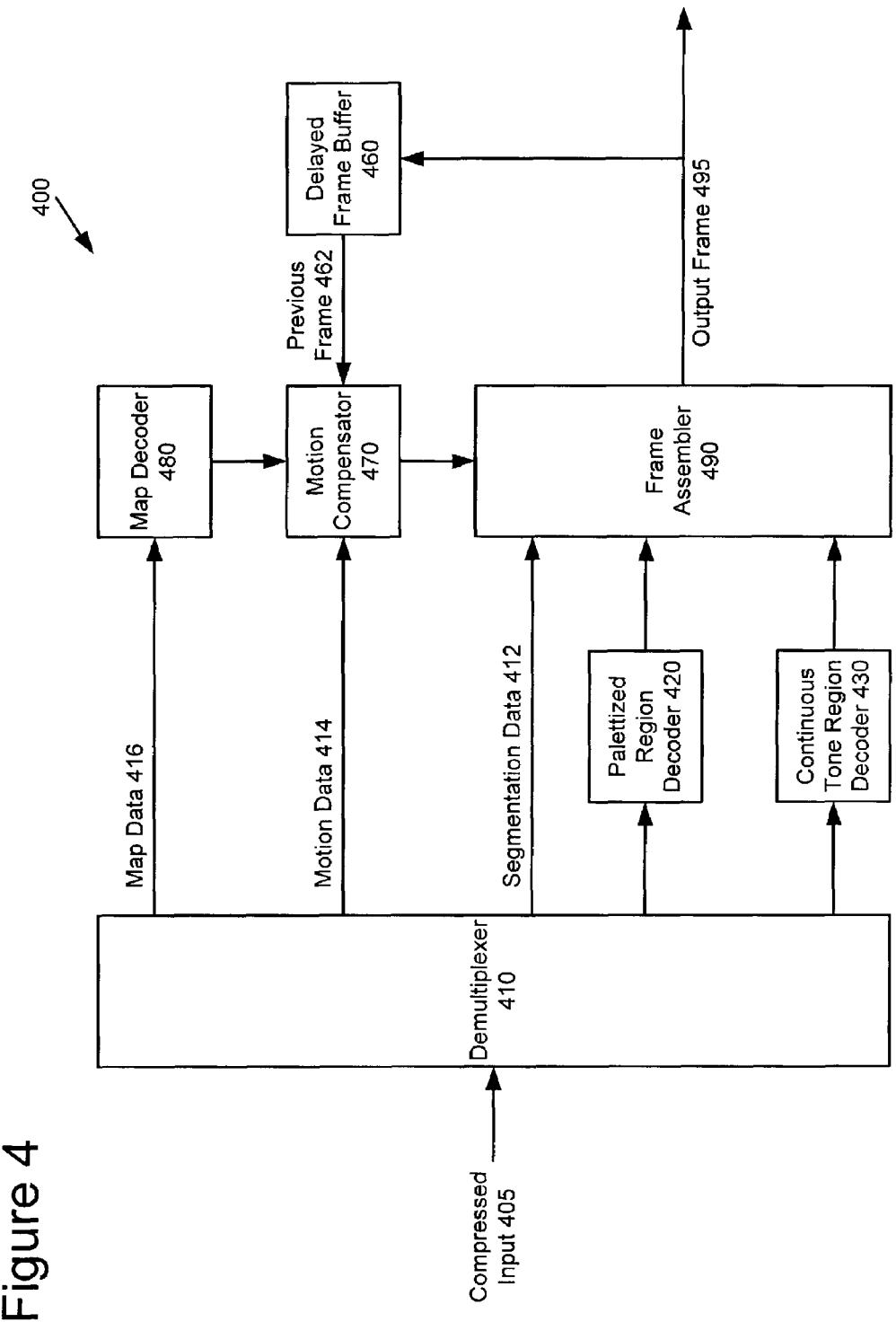
FIG. 4 is a block diagram of an exemplary screen capture decoder.

FIGS. 3 and 4 are block diagrams of an exemplary screen capture encoder (300) and an exemplary screen capture decoder (400), respectively. In various respects, the encoder (300) and decoder (400) are customized to compress/decompress frames of pixel information for screen areas captured from the screen of a visual display unit. Alternatively, the encoder (300) and decoder (400) compress/decompress frames of pixel information for other types of content.

In a common screen capture scenario, a screen capture module (not shown) captures screen areas that the encoder (300) compresses as a series of frames. The screen capture module can be a standalone software application, a feature of a multimedia production or encoding package, a plug-in, or some other form of product. The captured screen areas can show an entire screen (for example, an entire desktop environment), a selected window, or an arbitrary region of the desktop environment. In general, a screen area depicts some or all of the screen content presented or prepared for presentation in a desktop environment or other graphical user interface for a computer system. To capture a screen area, the screen capture module uses a Bit Block Transfer or other screen capture technique, such as one described in U.S. patent application Ser. No. 10/160,697, filed May 30, 2002, entitled "Reducing Information Transfer in Screen Capture Series," hereby incorporated by reference.

The screen capture module typically lets a user set high-level options for a capture session (e.g., media sources and types, quality, resultant bitrate, buffer size, and output stream or file location). The screen capture module can also present low-level options to the user, such as capture frame rate, output resolution, time distortion (e.g., slow motion). The capture frame rate for a series of screen areas may be fixed for the duration of the series or vary during screen capture for all or part of a screen area so as to increase temporal resolution when possible and decrease temporal resolution (even skipping frames) if necessary.

The relationships shown in FIGS. 3 and 4 indicate the main flow of information in the encoder and decoder; other relationships are not shown for the sake of simplicity. Depending on implementation and the type of compression/decompression desired, modules of the encoder or decoder can be added, omitted, split into multiple modules, combined with other modules, and/or replaced with like modules. In alternative embodiments (some of which are described below), an encoder or decoder includes different modules and/or other configurations of modules.

A. Exemplary Screen Capture Encoder

The exemplary screen capture encoder (300) includes a segmenter (310), a palettized region coder (320), a continuous tone region coder (330), a rate controller (340), a delayed frame buffer (360), a motion estimator (370), a map coder (380), and a multiplexer (390). With these modules, the encoder (300) performs live or off-line compression of a series of frames. The encoder (300) multiplexes the output of the various modules to produce a bitstream of compressed output (395) in system memory, a file in storage, one or more streams over a network, or another location. The input and output formats of the encoder (300) vary by implementation. For additional detail about particular modules of the encoder (300) in certain implementations, see the applications referenced in the Related Application Data section.

The encoder (300) compresses the first frame of the series as an I Frame (302) (alternatively called a key frame, intra frame, or intra-coded frame), using only information within the I Frame (302) to compress the I Frame (302). The encoder (300) compresses each of one or more subsequent frames of the series as a P Frame (304) (alternatively called a predicted frame, inter frame, or inter-coded frame). Each P Frame (304) may be compressed with reference to one or more other frames (for example, the previous frame). Also, the encoder (300) can compress a subsequent frame as an I Frame (304) periodically, as necessary (e.g., when the frame changes dramatically relative to the previous frame), or on some other basis.

For compression of an I Frame (302), the encoder (300) provides the I Frame (302) to the segmenter (310). The segmenter (310) partitions the I Frame (304) into continuous tone regions and palettized regions. The continuous tone regions are characterized by a large color space (e.g., 24 bits per pixel) and gradually varying color values from pixel to pixel. In a captured screen area, the continuous tone regions might include a background wallpaper photograph or an image in a web browser. On the other hand, the palettized regions are characterized by a smaller color space (e.g., 8 bits per pixel, often indices to a color palette), long runs of identical color values, and sharply contrasting changes in color value when changes occur. In a captured screen area, the palettized regions might include text on a solid background, icons, buttons, toolbars, menus, or other user interface features. The segmenter (310) may also segment graphical text from continuous tone regions, so that the text can be compressed losslessly, even if the encoder (310) introduces distortion in the continuous tone regions to reduce bitrate. Alternatively, the segmenter (310) uses other segmentation techniques and/or segments regions according to different or additional criteria.

The segmenter (310) transmits segmentation data (312) to the multiplexer (390) describing the segmented regions. The segmentation data (312) can be compressed in a lossy or lossless manner. The segmenter (310) also transmits pixel information for the regions of the I Frame (302) to the palettized region coder (320) and the continuous tone region coder (330).

The palettized region coder (320) compresses the palettized regions using techniques adapted to the characteristics of palettized screen content. Lossy compression techniques introduce distortion that can obliterate fine detail such as text and button graphics in palettized regions. Accordingly, the palettized region coder (320) uses a lossless compression technique such as run length coding, arithmetic coding, dictionary coding, variable-to-variable length coding, Huffman coding, LZ coding, a combination of the above, or some other entropy coding technique. Alternatively, the palettized region coder (320) uses compression techniques different than or in addition to the foregoing techniques to compress the palettized regions.

The palettized region coder (320) transmits data such as the pixel information and side information for the palettized regions to the multiplexer (390).

The continuous tone region coder (330) compresses the continuous tone regions using techniques adapted to the characteristics of continuous tone screen content. The continuous tone region coder (330) uses a combination of lossy and lossless compression techniques. Ideally, the continuous tone region coder (330) uses lossless compression or introduces imperceptible distortion, but the bitrate for such compressed output is often too high. In many scenarios, output must be compressed to a lower bitrate, or available bits are better spent on higher frame rate to smooth changes in palettized regions from frame to frame. To reduce bitrate for the continuous tone regions at some cost to quality, the continuous tone region coder (330) uses some form of quantization (e.g., scalar or vector, uniform or non-uniform, and static or adaptive). Quantization introduces irreversible loss of information, but can also allow the encoder (300) to regulate quality and bitrate. The quantization potentially follows a frequency transformation or decomposition (e.g., DCT, FFT, MLT, wavelets, subband coding) of the pixel information for the continuous tone regions, and can incorporate perceptual modeling. After the quantization, the continuous tone region coder (330) uses some form of lossless compression such as run length coding, arithmetic coding, dictionary coding, variable-to-variable length coding, Huffman coding, LZ coding, a combination of the above, or some other entropy coding technique. Alternatively, the continuous tone region coder (330) uses compression techniques different than or in addition to the foregoing techniques to compress the continuous tone regions.

The continuous tone region coder (330) transmits data such as pixel information and side information for the continuous tone regions to the multiplexer (390).

The rate controller (340) regulates the overall bitrate of the compressed output (395) by controlling the quantization of the continuous tone regions in the continuous tone region coder (330). The rate controller (340) receives information from other modules of the encoder (300), including the bitrate of the palettized regions for the frame and the current fullness of a virtual buffer in the multiplexer (390). Using this information and other information for the encoding session (e.g., average bits per pixel for I Frame or P Frame, quality criteria), the rate controller (340) budgets bits for the continuous tone regions and transmits the bit budget to the continuous tone region coder (330). The rate controller (340) seeks to satisfy numerous bitrate and quality constraints, both instantaneous and long term. For example, the rate controller (340) seeks to avoid virtual buffer underflow and overflow, maintain relatively constant bitrate over time, allocate bits for continuous tone regions fairly from frame to frame, and maintain at least a minimum quality for continuous tone regions. The continuous tone region coder (330) tests one or more quantization levels, and the results are evaluated in terms of bitrate and quality. When the quality of the continuous tone regions falls below a certain point, the encoder (300) may drop a frame or the continuous tone regions rather than send poor quality information. Alternatively, the rate controller (340) uses techniques different than or in addition to the foregoing techniques to control the rate and/or quality of some or all types of pixel information.

The multiplexer (390) multiplexes the information received from the various modules of the encoder (300), producing output (395) in a format that the decoder (400) recognizes. The multiplexer (390) may also receive other information not shown in FIG. 3, such as frame header information, from the various modules of the encoder (300) or elsewhere. The multiplexer (390) includes a virtual buffer, which stores a pre-determined duration of compressed information (e.g., 5 seconds) in order to smooth over short-term fluctuations in bitrate due to complexity changes or other characteristics of the content or encoder (300). The virtual buffer outputs data at a constant or relatively constant bitrate (e.g., to a file or stream). The current fullness of the virtual buffer, the rate of change of fullness of the buffer, and other characteristics of the buffer can be used by the rate controller (340).

For compression of a P Frame (304), the encoder (300) provides the P Frame (304) to the motion estimator (370). The motion estimator (370) compares the P Frame (304) to the previous frame (362) buffered in the delayed frame buffer (360), which can be an I Frame or P Frame. In a pixel-by-pixel map for the P Frame (304), the motion estimator (370) indicates which of the pixels of the P Frame (304) are identical in value to the pixels at the same locations in the previous frame (362). For regions of non-identical pixels in the P Frame (304), the motion estimator (370) computes motion data (372) (e.g., motion vector(s)) describing motion relative to the previous frame (362). To compute the motion data (372) the motion estimator searches in the previous frame (362) for regions that match the regions of non-identical pixels in the P frame (304). One match criterion is the number of exactly matching pixels. In the map for the P Frame (304), the motion estimator (370) indicates which of the pixels of the P Frame (304) should be reconstructed by motion compensation using the motion data (372). If the motion data includes multiple motion vectors, the map indicates which pixels should be reconstructed using which motion vector. The remaining pixels of the P Frame (304) are intra pixels—neither identical in value to pixels at the same locations in the previous frame (362) nor predicted by the motion estimation. Alternatively, the motion estimator (370) uses techniques different than or in addition to the foregoing techniques to predict values for P Frames from reference frames and indicate the results.

The motion estimator (370) transmits the pixel-by-pixel map to the map coder (380). The motion estimator (370) also transmits pixel information for the intra pixels (374) of the P Frame (304) to the segmenter (310).

The map coder (380) compresses the pixel-by-pixel map for the P Frame (304) using a lossless compression technique such as run length coding, arithmetic coding, dictionary coding, variable-to-variable length coding, Huffman coding, LZ coding, a combination of the above, or some other entropy coding technique. Alternatively, the map coder (380) uses compression techniques different than or in addition to the foregoing techniques to compress the pixel-by-pixel map. For example, in one alternative embodiment, the map coder compresses the map using lossy compression as well as lossless compression. The map coder (380) transmits data such as the compressed map to the multiplexer (390).

The segmenter (310), the palettized region coder (320), the continuous tone region coder (330), and the rate controller (340) perform the operations described above to compress the intra pixels (374) of the P Frame (304).

In alternative embodiments, an encoder with different modules and/or other configurations of modules performs rate allocation for continuous tone content in a mixed content frame. For example, although the exemplary encoder (300) includes a motion estimator (370) and a map coder (380), in an alternative embodiment, an encoder performs rate allocation for continuous tone content in a mixed content frame without motion estimation or map coding. In one implementation, the encoder (300) uses the same module for the palettized region coder (320) and the map coder (380).

B. Exemplary Screen Capture Decoder

The exemplary screen capture decoder (400) includes a demultiplexer (410), a palettized region decoder (420), a continuous tone region decoder (430), a frame assembler (440), a delayed frame buffer (460), a motion compensator (470), and a map decoder (480). With these modules, the decoder decompresses a series of frames for playback. For additional detail about particular modules of the decoder (400) in certain implementations, see the applications referenced in the Related Application Data section.

The demultiplexer (410) demultiplexes the compressed input (405), producing outputs for the various modules of the decoder (400). In addition to the outputs shown, the demultiplexer (410) may produce other outputs, such as frame header information for the frame assembler (490).

For decompression of an I Frame, the palettized region decoder (420) decompresses the palettized regions of the frame, for example, reversing the compression performed in the palettized region coder (320). The palettized region decoder (420) transmits the decompressed information for the palettized regions to the frame assembler (490).

The continuous tone region decoder (430) decompresses the continuous tone regions of the frame, producing reconstructed versions. For example, the continuous tone region decoder (430) reverses lossless compression performed in the continuous tone region coder (330) and then reverses any quantization and frequency transform/decomposition operations performed in the continuous tone region coder (330), typically performing the inverse of the operation. The continuous tone region decoder (420) transmits the decompressed information for the continuous tone regions to the frame assembler (490).

The frame assembler (490) receives the segmentation data (412) from the demultiplexer (410) as well as the decompressed information from the palettized region decoder (420) and the continuous tone region decoder (430). Using this information, the frame assembler (490) constructs the I Frame. For example, the frame assembler (490) uses the segmentation data (412) to determine where to place the decompressed pixel information for the palettized regions and continuous tone regions in the I Frame. The frame assembler (490) then outputs a frame (495) for playback. The delayed frame buffer (460) can store the output frame (495) for use as a reference frame for the following frame.

For decompression of a P Frame, the map decoder (480) decompresses the map data (416), for example, reversing the compression performed in the map coder (380). The map decoder (480) transmits data such as the decompressed map to the motion compensator (470). In one implementation, the decoder (400) uses the same module for the palettized region decoder (420) and the map decoder (480).

The motion compensator (470) receives the motion data (414) from the demultiplexer (410) as well as the decompressed map from the map decoder (480). Using the decompressed map and the previous frame (462), the motion compensator (470) constructs the regions of pixels of the P Frame that are identical in value to the pixels at the same locations in the previous frame (462). Using the decompressed map, the motion data (414), and the previous frame (462), the motion compensator (470) constructs the motion-compensated regions of pixels of the P Frame. Alternatively, the motion compensator (470) uses techniques different than or in addition to the foregoing techniques to compensate for prediction in the encoder. The motion compensator (470) transmits the constructed regions of the P Frame to the frame assembler (490).

The palettized region decoder (420) and continuous tone region decoder (430) decompress pixel information for the intra pixels of the P Frame, using the techniques described above.

The frame assembler (490) receives the decompressed pixel information for the intra pixels, the segmentation data (412) from the demultiplexer (410), and the constructed regions from the motion compensator (470). Using this information, the frame assembler (490) constructs the P Frame. For example, the frame assembler (490) uses the segmentation data (412) to determine how to place the decompressed pixel information for the palettized regions and continuous tone regions of the intra pixels of the P Frame around the constructed regions from the motion compensator (470). The frame assembler (490) then outputs a frame (495) for playback, which can be stored in the delayed frame buffer (460) for use as a reference frame.

In alternative embodiments, a decoder includes different modules and/or other configurations of modules. For example, although the exemplary decoder (400) includes a motion compensator (470) and a map decoder (480), in an alternative embodiment, a decoder decompresses a series of frames without motion compensation or map decoding.

III. Segmentation of Continuous Tone and Palettized Content

Coding of palettized content and continuous tone content can often be improved if an encoder divides the content into regions, such as rectangular regions in a frame, and classifies each region as either palettized or continuous tone. Each region can then be encoded using algorithms adapted for coding the type of content in the region. For example, palettized regions may be encoded losslessly, while continuous tone regions may be encoded in a lossy manner.

Differences in the characteristics of palettized regions and continuous tone regions facilitate segmentation. A pixel within a palettized portion of a frame will typically have neighboring pixels with the same value. For example, for a pixel within in a flat background, most neighboring values have the same color. Similarly, many neighboring values have the same color for pixels of text. However, in typical continuous tone areas, neighboring values are different colors.

As described above, a screen capture encoder may include a segmenter that creates a pixel-by-pixel map for a frame. At each pixel location in the map, a "uniqueness" number indicates how many unique pixel color values are within some neighborhood of the pixel location. The segmenter classifies each pixel in the image as palettized or continuous tone by looking at the relationship of each uniqueness number to a threshold. As an example, the segmenter classifies a pixel as continuous tone if the number of unique values in a 3×3 neighborhood centered at that location is greater than or equal to three. After classifying the pixels in the image, the segmenter subdivides the image into palettized or continuous tone regions based on the density of palettized or continuous tone pixels within the regions. For a P frame, the segmenter can perform segmentation only on intra pixels (pixels of the P frame that are not identical to the previous frame or motion estimated from the previous frame).

IV. Rate Allocation for Continuous Tone Content in a Mixed Content Frame

An encoder such as a screen capture encoder then allocates bits for encoding continuous tone content in a mixed content frame. Allocating bits between the different types of content (e.g., palettized content and continuous tone content) improves overall quality of the compressed frames. Otherwise, more frames may be dropped (hurting the temporal quality for all content), or image quality may be unnecessarily compromised.

Figure 5:
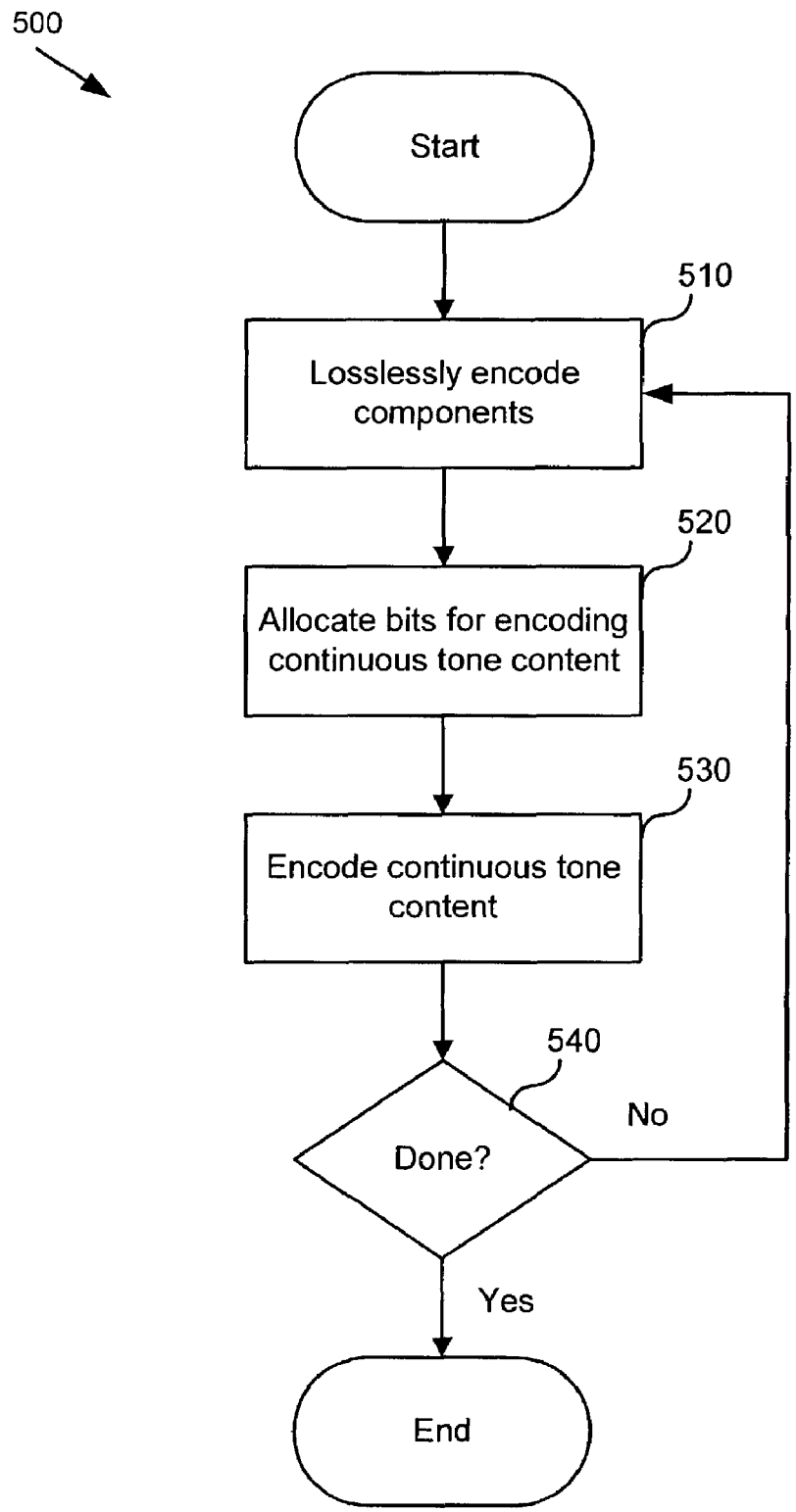
FIGS. 5 and 6 are flowcharts showing techniques for allocating bits for continuous tone content when encoding a mixed content frame.

FIG. 5 shows a technique (500) for allocating bits for continuous tone content when encoding a mixed content frame. An encoder losslessly encodes (510) components of the frame before allocating bits for encoding the continuous tone content in the frame. In I frames, losslessly encoded components may include a frame header and the palettized content for the frame. In P frames, losslessly encoded components may include a frame header, motion estimation data, and the palettized content for the frame. If the encoder has performed segmentation on the frame prior to encoding, the encoder also may losslessly encode segmentation information corresponding to locations of continuous tone regions for either I or P frames. While segmentation information can be lossily compressed, segmentation information typically consumes a small percentage of the overall bitrate. Therefore, encoding the segmentation information lossily does not result in appreciable bitrate savings.

Next, the encoder allocates (520) bits for encoding the continuous tone content in the frame. For example, the encoder allocates bits as described below with reference to FIGS. 6 and 7. The encoder then encodes (530) the continuous tone content (e.g., using lossy compression, different lossless compression modes, or some combination thereof). The bit allocation affects quality and/or bitrate by, for example, controlling quantization for the continuous tone content until the bitrate for the continuous tone content is under or within some target range of the bit allocation. The encoder determines (540) whether to continue processing the series of frames. If not, the encoding process ends. If so, more frames are processed.

Figure 6:
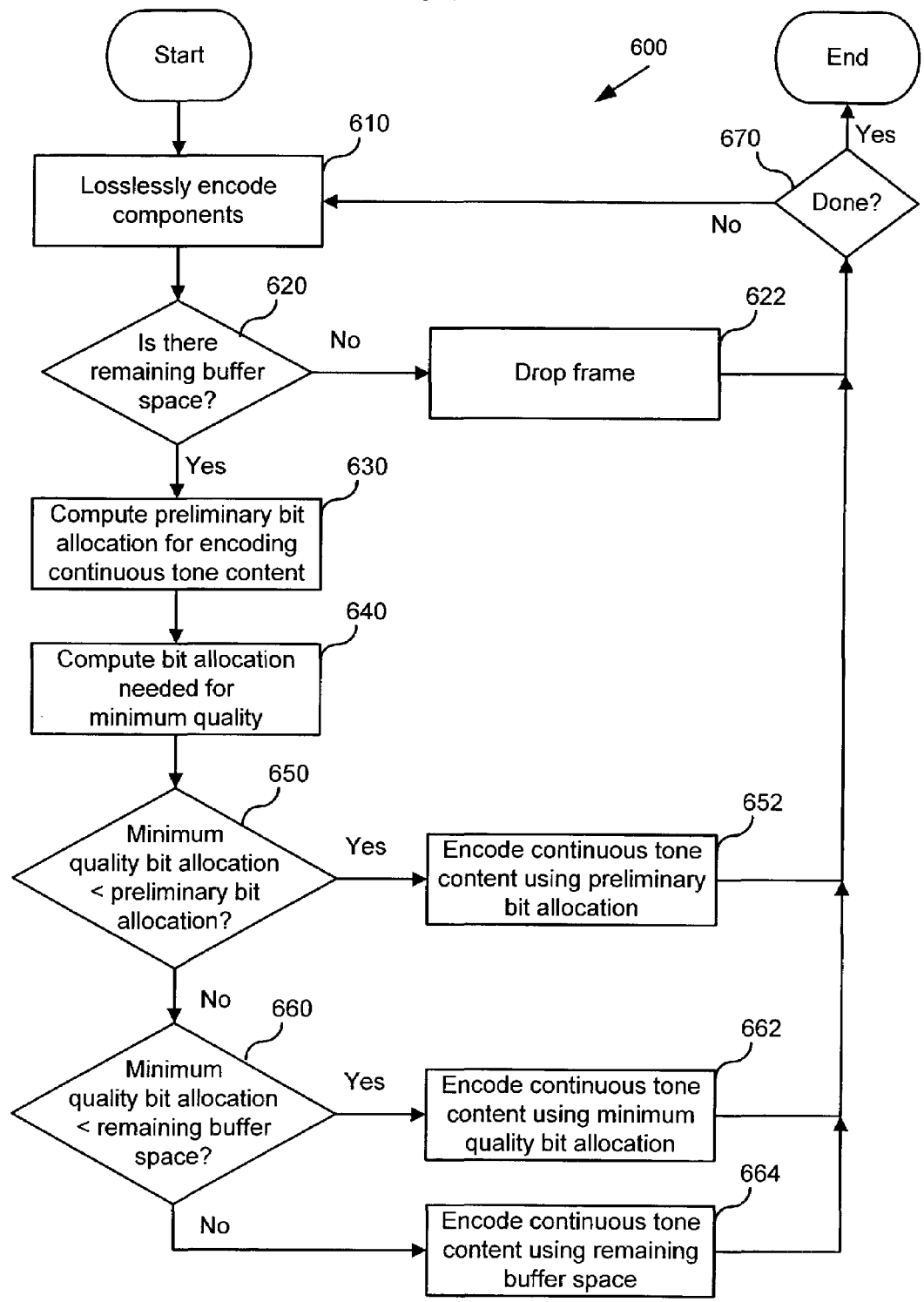

FIG. 6 shows a detailed technique (600) for allocating bits for continuous tone content when encoding a mixed content frame. In this technique (600), the encoder uses anywhere from 0 to $S-B_L$ bits to encode the continuous tone content, where S is the number of bits left in a virtual buffer after encoding the previous frame, and where $B_L$ is the number of bits used to losslessly encode some components of the frame. The encoder determines how many bits to allocate for encoding continuous tone content by evaluating several factors. In sections, these factors are expressed in equations and inequalities. The equations and inequalities are high level, have various equivalents, and are capable of various implementations in computer-executable instructions.

As in FIG. 5, to start the encoder losslessly encodes (610) components in a frame. Losslessly encoding (610) the components uses a number of bits $B_L$.

The encoder then checks (620) whether there is space remaining in the buffer after losslessly encoding the components of the frame. If not, the encoder drops (622) the frame—encoding the continuous tone content in the frame when there is no space left in the buffer would cause a buffer overflow.

A. Preliminary Bit Allocation

Figure 7:
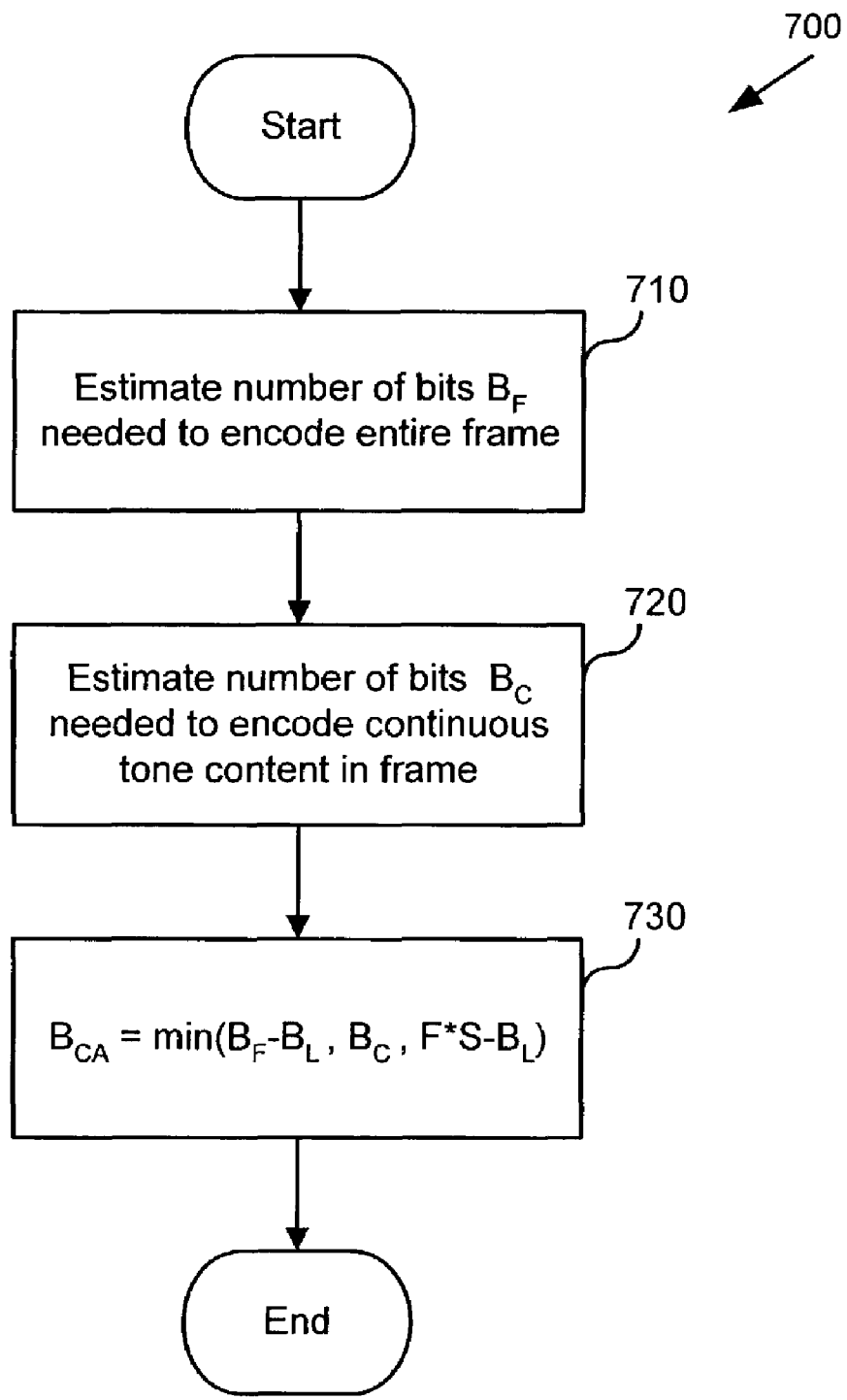
FIG. 7 is a flowchart showing an exemplary technique for computing a preliminary bit allocation.

If there is space remaining in the buffer, the encoder computes a preliminary bit allocation (630) for encoding the continuous tone content. FIG. 7 shows details of an exemplary technique (700) for computing a preliminary bit allocation. Alternatively, the encoder uses another technique and/or different formulas to compute the preliminary bit allocation.

With reference to FIG. 7, the encoder estimates (710) the number of bits $B_F$ needed to encode the entire current frame. $B_F$ is a number of bits:

$$B_F=(\text{BitRate}/\text{FrameRate})*R_F \quad (1),$$

where $R_F$ is a factor adjusting for the current frame type, BitRate is the bits per second for the series of frames (e.g., 100 kilobits per second ["kbps"]), and FrameRate is the frames per second for the series of frames (e.g., 10 frames per second ["fps"]).

For an I frame and a P frame of the same quality, the I frame typically consumes much more bitrate than the P frame. The values for $R_F$ are experimentally derived, and may be fixed or vary during the encoding. In one implementation, the value of $R_F$ for I frames ["$R_{FI}$"] and the value of $R_F$ for P frames ["$R_{FP}$"] follow the relationship:

$$(R_{FI}*(I \text{ frame }\%))+(R_{FP}*(P \text{ frame }\%))=1 \quad (2)$$

For example, suppose I frames and P frames are expected to comprise 1% and 99%, respectively, of the total frames (e.g., an I frame every 10 seconds for a 10 fps series).

$R_{FI}=20$ and $R_{FP}=0.8$ since $(20*0.01)+(0.8*0.99)\approx1$. As the percentages of the two frame types vary, $R_{FI}$ and $R_{FP}$ can be adjusted, as appropriate, such that the relationship generally holds.

The encoder also estimates (720) the number of bits $B_C$ needed to encode the continuous tone content in the frame. $B_C$ is a number of bits:

$$B_C=((BitRate/FrameRate)/(Width*Height))*R_C*N_{CT} \quad (3),$$

where $R_C$ is a factor adjusting for the complexity of encoding continuous tone pixels. In most scenarios, encoding continuous tone pixels consumes much more bitrate than encoding palettized pixels. The values for $R_C$ is experimentally derived, and may be fixed or vary during the encoding. In one implementation, $R_C=50$. Width and Height refer to the dimensions of the rectangular frame (more generally, Width*Height refers to the number of pixels per frame), and $N_{CT}$ is the number of continuous tone pixels encoded in the frame. For example, for an I frame with dimensions of 1024 pixels×768 pixels (a total of 786,432 pixels in the frame) where 50% of the pixels in the frame are continuous tone, $N_{CT}=393,216$ pixels. As another example, for a P frame with dimensions of 1024 pixels×768 pixels where the continuous tone pixels to be encoded comprise 1% of the pixels in the frame, $N_{CT}=7864$ pixels. Such a situation may arise when the position of a palettized window on a continuous tone background shifts by a few pixels relative to the previous frame, revealing previously hidden continuous tone pixels.

The encoder then computes (730) the preliminary bit allocation $B_{CA}$ is as the minimum of three values. $B_{CA}$ is a number of bits:

$$B_{CA}=\min(B_F-B_L, B_C, F(*S)-B_L) \quad (4).$$

$B_F-B_L$ is the difference between the estimated bits needed to encode the entire frame and the bits already used to losslessly encode components of the frame. F*S is a percentage of the number of bits S available in the buffer when encoding for the current frame begins. The encoder uses the buffer filling factor F to avoid filling the buffer to the point that future frames are dropped. The value for F is experimentally derived, and may be fixed or vary during the encoding. In one implementation, F is 0.8.

B. Minimum Quality Allocation

In addition to computing (630) a preliminary bit allocation, it may be desirable to set a minimum quality level such that encoding of continuous tone content in frames satisfies a quality standard for a given application.

Referring again to FIG. 6, the encoder computes (640) a minimum quality bit allocation for the continuous tone content. $B_{minq}$ is a number of bits:

$$B_{minq}=BPP_{minq}*N_{CT} \quad (5),$$

where $BPP_{minq}$ is a measure of bits per pixel at which continuous tone portions are expected to satisfy a visual quality standard for an application, and $N_{CT}$ is the number of continuous tone pixels in the frame. For example, an application might require that continuous tone pixels be encoded with at least 0.6 bits per pixel (bpp) to satisfy a desired minimum quality standard. If a frame contains 100,000 continuous tone pixels, the minimum quality bit allocation $B_{minq}$ for encoding the continuous tone pixels in the frame is 100,000 pixels*0.6 bpp=60 kb.

Alternatively, the encoder uses another quality metric or no quality metric at all. For example, minimum quality could be measured by a minimum number of bit planes in an image.

C. Choosing a Bit Allocation for Encoding Continuous Tone Content

After calculating possible bit allocations (e.g., preliminary bit allocation, minimum quality bit allocation), the encoder determines which of the bit allocations to use for encoding the continuous tone content in the frame. In the technique (600) of FIG. 6, the encoder determines (650) if the minimum quality bit allocation is less than the preliminary bit allocation. If so, the encoder uses the preliminary bit allocation to encode (652) the continuous tone content. For example, the encoder adjusts quantization for the continuous tone content until the bitrate for the continuous tone content is just under or within some target range above/below the preliminary bit allocation.

If the minimum quality bit allocation is not less than the preliminary bit allocation, the encoder checks (660) whether the minimum quality bit allocation is less than the space remaining in the buffer. The encoder could instead compare the minimum quality bit allocation to a percentage of the space remaining in the buffer in cases where using all available buffer space for encoding continuous tone content for a frame is not desirable. Such a percentage, if used, can be varied as appropriate for a given application.

If the minimum quality bit allocation is less than the space remaining (or, if applicable, a desired percentage of the space remaining) in the buffer, the encoder uses the minimum quality bit allocation to encode (662) the continuous tone content. Otherwise, the encoder uses the remaining buffer space (or a desired percentage) to encode (662) the continuous tone content. For example, as above, the encoder adjusts quantization for the continuous tone content until the bitrate for the continuous tone content is just under or within some target range.

Finally, the encoder determines (670) whether to continue processing the series of frames. If not, the encoding process ends. If so, more frames are processed.

D. Example

The following numerical example illustrates the techniques (600, 700) of FIGS. 6 and 7 and the formulas described above.

In the example, frames in a sequence of frames are encoded for transmission at a bitrate of 100 kbs and a frame rate of 10 fps. The buffer has a capacity of 500 kb (e.g., five seconds at a bitrate of 100 kbs). The example begins with the encoding of an I frame comprising a palettized window on a continuous tone background. The encoder begins encoding the I frame at a point where the buffer is filled to 40% of its capacity (e.g., the space S remaining in the buffer is 300 kb), and the desired buffer filling factor is 80% (e.g., F=0.8). A P frame is encoded after the I frame.

To encode the I frame, the selected components of the I frame are first losslessly encoded, using 20 kb of buffer space ($B_L=20$ kb). The encoder then estimates the number of bits $B_F$ needed to encode the entire I frame. In this example, $R_F=20$ for I frames. Thus, $B_F$=BitRate/FrameRate*$R_F$=100 kbs/10 fps*20 frames=200 kb.

The encoder also estimates the number of bits $B_C$ needed to encode the continuous tone content in the frame. In this example, the frame has a width of 1024 pixels and a height of 768 pixels, $R_C=50$, and the number of continuous tone pixels $N_{CT}=363,216$ (e.g., 50% of the pixels in the frame are continuous tone, and since the frame is an intra frame, each of the continuous tone pixels will be encoded). Thus, $B_C$= ((BitRate/FrameRate)/(Width*Height))*$R_C$*$N_{CT}$=(100 kbs/ 10 fps)/(786,432 pixels per frame))*50*363,216 pixels=250 kb.

The encoder then computes the preliminary bit allocation $B_{CA}$ for the I frame. Since $B_{CA} = \min(B_F - B_L, B_C, (F*S) - B_L)$, the following are true for the I frame:

$B_F - B_L = 200 \text{ kb} - 20 \text{ kb} = 180 \text{ kb}$, $F*S - B_L = 0.8*300 \text{ kb} - 20 \text{ kb} = 220 \text{ kb}$, and $B_{CA} = \min(B_F - B_L, B_C, F*S - B_L) = \min(180 \text{ kb}, 250 \text{ kb}, 220 \text{ kb}) = 180 \text{ kb}$.

Thus, the preliminary bit allocation $B_{CA}$ for encoding the continuous tone content in the I frame is 180 kb.

The encoder also computes a minimum quality bit allocation for the continuous tone content in the I frame. With a minimum quality standard of 0.6 bits for each of the 393,216 continuous tone pixels being encoded, the minimum quality bit allocation $B_{minq} = BPP_{minq} * N_C = 393{,}216$ pixels*0.6 bpp≈236 kb.

Because $B_{minq}$ is not less than $B_{CA}$, the encoder checks whether the minimum quality bit allocation is less than the space remaining in the buffer after the selected components have been losslessly encoded (e.g., $S - B_L$). At this point $S - B_L = 300 \text{ kb} - 20 \text{ kb} = 280 \text{ kb}$. Because 236 kb<280 kb, the encoder uses the minimum quality bit allocation to encode the continuous tone content for the I frame.

Continuing the example, a P frame is encoded after the I frame. Since the frame rate is 10 fps, the P frame is 0.1 second after the I frame in the series. In practice, encoding times for I frames may be longer than for P frames, however. The P frame comprises the window and background of the I frame, where the window has shifted by a few pixels relative to the previous frame. While the encoder encodes the I frame and moves the compressed data for the I frame into the buffer, data from previously encoded frames leaves the buffer at the rate of 100 kbs. In other words, every 0.1 seconds, 10 kb of data leaves the buffer. When encoding for the P frame in the example begins, the space S is equal to the space in the buffer before encoding the previous frame, plus 10 kbs for newly freed space, minus the space used by encoding the previous frame. Thus, $S = 300 \text{ kb} + 10 \text{ kb} - 236 \approx 74 \text{ kb}$. The desired buffer filling factor remains 80% (e.g., F=0.8).

To encode the P frame, the selected components of the P frame are first losslessly encoded, using 1 kb of buffer space ($B_L = 1$ kb). The encoder then estimates the number of bits $B_F$ needed to encode the entire P frame. In this example, $R_F = 0.8$ for P frames. Thus, $B_F = \text{BitRate}/\text{FrameRate} * R_F = 100 \text{ kbs}/10 \text{ fps} * 0.8 \text{ frame} = 8 \text{ kb}$.

The encoder also estimates the number of bits $B_C$ needed to encode the continuous tone content in the P frame. In this example, the P frame, like the I frame, has a width of 1024 pixels and a height of 768 pixels, and $R_C = 50$. Most of the P frame is identical to the I frame or provided by motion estimation, but the shifting of the position of the window between the I frame and the P frame reveals previously hidden continuous tone pixels in the background amounting to roughly 1% of the total pixels in the frame. Thus, for the P frame, $N_{CT} = 7{,}864$ pixels, and $B_C = (100 \text{ kbs}/10 \text{ fps})/(786{,}432 \text{ pixels per frame})*50*7{,}864 \text{ pixels} \approx 5 \text{ kb}$.

The encoder then computes the preliminary bit allocation $B_{CA}$ for the P frame. Since $B_{CA} = \min(B_F - B_L, B_C, F*S - B_L)$, the following are true for the P frame:

$B_F - B_L = 8 \text{ kb} - 1 \text{ kb} = 7 \text{ kb}$, $F*S - B_L = 0.8*74 \text{ kb} - 1 \text{ kb} \approx 58.2 \text{ kb}$, and $B_{CA} = \min(7 \text{ kb}, 5 \text{ kb}, 58.2 \text{ kb}) = 5 \text{ kb}$.

Thus, the preliminary bit allocation $B_{CA}$ for encoding the continuous tone content in the P frame is 5 kb.

The encoder also computes a minimum quality bit allocation for the continuous tone content in the P frame. With a minimum quality standard of 0.6 bits for each of the 7,864 continuous tone pixels being encoded, the minimum quality bit allocation $B_{minq} = 7{,}864$ pixels*0.6 bpp≈4.7 kb.

Because $B_{minq}$ is less than $B_{CA}$ (e.g., $B_{minq} < B_{CA}$), the encoder uses the preliminary bit allocation $B_{CA}$ to encode the continuous tone content for the P frame.

Having described and illustrated the principles of my invention with reference to various described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of my invention may be applied, I claim as my invention all such embodiments as may come within the scope and spirit of the following claims and equivalents thereto.

I claim:

1. In a screen capture encoder, a method for encoding captured screen content, the method comprising:
    encoding one or more components of the captured screen content using lossless compression;
    allocating bits for continuous tone pixels of the captured screen content, wherein the allocating comprises:
        computing a preliminary bit allocation;
        comparing the preliminary bit allocation with a number of available bits in view of the encoding using lossless compression; and
        allocating the bits based at least in part on results of the comparing; and
    encoding the continuous tone pixels, wherein the allocating regulates quality and bitrate for the continuous tone pixels.

2. The method of claim 1 wherein the one or more components of the captured screen content encoded using lossless compression include palettized pixels.

3. The method of claim 2 wherein the one or more components of the captured screen content encoded using lossless compression further include a segmentation map.

4. The method of claim 2 wherein the one or more components of the captured screen content encoded using lossless compression further include motion information and frame header information.

5. The method of claim 1 further comprising:
    repeating the encoding the one or more components, the allocating, and the encoding the continuous tone pixels on a frame-by-frame basis for a sequence of plural frames.

6. In a screen capture encoder, a method for encoding captured screen content, the method comprising:
    encoding one or more components of the captured screen content using lossless compression;
    allocating bits for continuous tone pixels of the captured screen content, wherein the allocating comprises:
        computing a preliminary bit allocation;
        computing a minimum quality bit allocation;

comparing the preliminary bit allocation and the minimum quality bit allocation; and
allocating the bits based at least in part on results of the comparing; and
encoding the continuous tone pixels, wherein the allocating regulates quality and bitrate for the continuous tone pixels.

7. In a screen capture encoder, a method for encoding captured screen content, the method comprising:
encoding one or more components of the captured screen content using lossless compression;
allocating bits for continuous tone pixels of the captured screen content, wherein the allocating comprises:
estimating a number of bits needed to encode the captured screen content;
estimating a number of bits needed to encode the continuous tone pixels; and
computing the minimum of:
the difference between the estimated number of bits needed to encode the captured screen content and a number of bits spent in the encoding using lossless compression;
a number of available bits in view of the encoding using lossless compression; and
the estimated number of bits needed to encode the continuous tone pixels; and
encoding the continuous tone pixels, wherein the allocating regulates quality and bitrate for the continuous tone pixels.

8. The method of claim 7 wherein the number of available bits is further reduced according to a buffer filling factor.

9. The method of claim 8 wherein the buffer filling factor is fixed during encoding.

10. The method of claim 8 wherein the buffer filling factor is variable during encoding.

11. The method of claim 7 wherein the encoding the continuous tone pixels comprises using a combination of lossy compression and lossless compression.

12. A computer-readable medium storing computer-executable instructions for causing a computer programmed thereby to perform a method of claim 7.

13. A computer-readable medium storing computer-executable instructions for causing a computer system programmed thereby to perform method of encoding a mixture of palettized screen capture content and continuous tone screen capture content, the method comprising:
encoding the palettized screen capture content;
encoding a frame header and segmentation map for a frame that includes the palettized screen capture content and the continuous tone screen capture content;
allocating bits for encoding the continuous tone screen capture content; and
encoding the continuous tone screen capture content, wherein the allocating controls bitrate for the continuous tone screen capture content.

14. The computer-readable medium of claim 13 wherein the encoding the palettized screen capture content uses lossless compression and wherein the encoding the continuous tone screen capture content uses lossy and lossless compression.

15. The computer-readable medium of claim 13 wherein the allocating depends at least in part upon preliminary and minimum quality bit allocations for the continuous tone screen capture content and a number of available bits.

16. A computer-readable medium storing computer-executable instructions for causing a computer system programmed thereby to perform method of encoding a mixture of palettized screen capture content and continuous tone screen capture content, the method comprising:
encoding the palettized screen capture content;
allocating bits for encoding the continuous tone screen capture content, wherein the allocating depends at least in part upon preliminary and minimum quality bit allocations for the continuous tone screen capture content and a number of available bits; and
encoding the continuous tone screen capture content, wherein the allocating controls bitrate for the continuous tone screen capture content.

17. A computer-readable medium storing computer-executable instructions for causing a computer system programmed thereby to perform a method of encoding a frame comprising palettized content and continuous tone content, the method comprising:
encoding the palettized content in the frame;
checking for a number of bits available after the encoding the palettized content;
based at least in part on the checking, allocating a second number of bits, wherein the second number of bits is less than or equal to the number of bits available after the encoding the palettized content, and wherein the allocating comprises:
computing a preliminary bit allocation;
comparing the preliminary bit allocation with the number of bits available after the encoding the palettized content; and
allocating the bits based at least in part on results of the comparing; and
encoding the continuous tone content in the frame with the second number of bits.

18. A computer-readable medium storing computer-executable instructions for causing a computer system programmed thereby to perform a method of encoding a frame comprising palettized content and continuous tone content, the method comprising:
encoding the palettized content in the frame;
checking for a number of bits available after the encoding the palettized content;
based at least in part on the checking, allocating a second number of bits, wherein the second number of bits is less than or equal to the number of bits available after the encoding the palettized content, and wherein the allocating comprises:
computing a preliminary bit allocation;
computing a minimum quality bit allocation;
comparing the preliminary bit allocation and the minimum quality bit allocation; and
allocating the bits based at least in part on results of the comparing; and
encoding the continuous tone content in the frame with the second number of bits.

19. The computer-readable medium of claim 18 wherein the method further comprises:
repeating the encoding the palettized content, the checking, the allocating, and the encoding the continuous tone content on a frame-by-frame basis for a sequence of plural frames.

20. The computer-readable medium of claim 18 wherein the encoding the palettized content uses lossless compression, and wherein the encoding the continuous tone content uses a combination of lossy compression and lossless compression.

* * * * *

UNITED STATES PATENT AND TRADEMARK OFFICE
CERTIFICATE OF CORRECTION

PATENT NO. : 6,980,695 B2
APPLICATION NO. : 10/186481
DATED : December 27, 2005
INVENTOR(S) : Sanjeev Mehrotra It is certified that error appears in the above-identified patent and that said Letters Patent is hereby corrected as shown below:

On page 2, item (56), under "Other Publications", in column 1, line 8, delete "Dowloaded" and insert -- Downloaded --, therefor.

On page 2, item (56), under "Other Publications", in column 1, line 11, delete "Dowloaded" and insert -- Downloaded --, therefor.

On page 2, item (56), under "Other Publications", in column 1, line 34, delete "Askoy" and insert -- Aksoy --, therefor.

On page 2, item (56), under "Other Publications", in column 2, line 40, delete "ReportNo." and insert -- Report No. --, therefor.

On page 2, item (56), under "Other Publications", in column 2, line 45, delete "Effieient" and insert -- Efficient --, therefor.

On page 3, item (56), under "Other Publications", in column 1, line 4, delete "No., 4" and insert -- No.4 --, therefor.

In column 12, line 64, delete "(2)" and insert -- (2), --, therefor.

In column 13, line 33, delete "(4)." and insert -- (4), --, therefor.

Signed and Sealed this

Eighth Day of September, 2009

David J. Kappos
*Director of the United States Patent and Trademark Office*